United States Patent [19]
Linden et al.

[11] Patent Number: 5,774,820
[45] Date of Patent: Jun. 30, 1998

[54] METHOD AND APPARATUS FOR LIMITING THE SPEED OF A MOTOR VEHICLE

[75] Inventors: Thomas Linden, Stuttgart; Jörg Saur, Eislingen; Hermann Gaus, Stuttgart, all of Germany

[73] Assignee: Mercedes-Benz AG, Germany

[21] Appl. No.: 533,818

[22] Filed: Sep. 25, 1995

[30]    Foreign Application Priority Data

Sep. 23, 1994 [DE] Germany .......................... 44 32 022.2

[51] Int. Cl.⁶ .................................................. B60K 31/00
[52] U.S. Cl. ............................. 701/93; 701/110; 180/179
[58] Field of Search ...................... 364/426.041, 426.042, 364/426.043, 426.044, 431.07; 123/350, 352; 180/170, 176–179; 701/93, 94, 95, 96, 110

[56]          References Cited

U.S. PATENT DOCUMENTS

| | | | |
|---|---|---|---|
| 4,374,422 | 2/1983 | O'Keefe, Jr. et al. | 364/426.042 |
| 4,419,729 | 12/1983 | Krieder | 364/426.042 |
| 4,467,428 | 8/1984 | Caldwell | 364/426.042 |
| 4,474,155 | 10/1984 | Sagues | 123/352 |
| 4,599,918 | 7/1986 | Stelter et al. | 74/866 |
| 4,814,991 | 3/1989 | Tada et al. | 364/426.041 |
| 4,884,203 | 11/1989 | Preis et al. | 180/179 |
| 4,917,206 | 4/1990 | Hara | 180/179 |
| 4,939,657 | 7/1990 | Imai et al. | 364/426.043 |
| 4,947,952 | 8/1990 | Kajiwara | 180/178 |
| 5,019,986 | 5/1991 | Londt et al. | 364/426.042 |
| 5,420,793 | 5/1995 | Oo et al. | 180/179 |

FOREIGN PATENT DOCUMENTS

| | | |
|---|---|---|
| 28 36 342 | 2/1980 | Germany . |
| 29 25 566 | 1/1981 | Germany . |
| 32 23 555 | 12/1983 | Germany . |
| 33 29 783 | 2/1985 | Germany . |
| 36 18 844 | 12/1987 | Germany . |
| 37 03 645 | 8/1988 | Germany . |
| 39 28 045 | 3/1990 | Germany . |
| 41 15 903 | 11/1991 | Germany . |
| 43 13 173 | 10/1994 | Germany . |
| 4-27626 A | 1/1992 | Japan . |

*Primary Examiner*—Gary Chin
*Attorney, Agent, or Firm*—Evenson, McKeown, Edwards & Lenahan, P.L.L.C.

[57]          ABSTRACT

A method and apparatus for limiting the speed of a motor vehicle in which the power applied to the vehicle wheels is controlled even when the actual speed is within a range of permitted speeds, but a speed demanded by the driver is in a speed range to be avoided. By way of the control intervention, the actual speed is, in this case, brought to the limiting speed in accordance with a specified open-loop control characteristic. When the actual speed is near the limiting speed, the system switches over to an open-loop speed-control, and when the speed demanded by the driver is within the range of permitted speeds, this requirement of the driver is used to determine the speed.

10 Claims, 2 Drawing Sheets

METHOD AND APPARATUS FOR LIMITING THE SPEED OF A MOTOR VEHICLE

BACKGROUND AND SUMMARY OF THE INVENTION

The invention relates to a method and an apparatus for limiting the speed of a motor vehicle to a specified limiting speed which separates a range of permitted speeds from a range of speeds which are to be avoided.

It is known to keep the speed of a motor vehicle at a set value by means of a so called closed-loop cruise control system. On attaining the desired speed, the driver releases a closed-loop cruise control system operating lever, and thereby activates the closed-loop cruise control system, establishing the instantaneous speed value as the required value. Such a closed-loop cruise control system is mainly used for the purpose of unburdening the driver in the case of long automobile journeys, whenever he wishes to drive at a constant speed for a fairly long period of time, for example on motorway sections.

A different driving situation is present when a certain maximum or minimum speed is specified on a particular section of the road, for example, the speed-limit zones in built-up areas, with a maximum permissible speed of 30 km/h. In this case, the driver should also be in a position to drive with a lower speed in the case of a maximum speed limit or with a higher speed in the case of a minimum speed limit. The system should then only prevent the vehicle from travelling at a speed above or below the specified limit. A closed-loop cruise control system is not suitable for this purpose because, when activated, the closed-loop cruise control system always attempts to adjust the speed to the limiting speed and, furthermore, is automatically switched off when the brakes are operated, after which it has to be reactivated by driving at the limiting speed. There is, in consequence, a requirement for systems with which the vehicle speed can be limited in the upward or downwards direction to a specified limiting speed and which, simultaneously, permit driving at any given speed above or below this limiting speed.

German Patent Document DE-OS 33 29 783 A1 provides an arrangement for automatically preventing driving above a specified maximum speed by measures applied to the vehicle. When the maximum speed is exceeded, the engine power is limited (for example, by means of fuel throttling), under the control of a microprocessor. In a similar manner, a device for limiting the travelling speed of motor vehicles described in German Patent Document DE-OS 29 25 566 A1 prevents continuing excess speed beyond the maximum speed by rendering increased actuation of the accelerator pedal by the driver ineffective when the maximum speed is exceeded. In both cases, the limiting speed can be adjusted, specifically from outside or by the driver. the case of a vehicle with an engine whose power can be controlled by means of an accelerator pedal, German Patent Document DE-OS 28 36 342 A1 provides a mechanical solution for preventing a maximum permissible speed from being exceeded. In this arrangement, a servomotor acts on a control element influencing the driving engine power, in particular a throttle butterfly, in such a way that the engine power is reduced, independently of the accelerator pedal position, as soon as the vehicle speed exceeds the maximum speed. In this case, the servomotor is brought into action by a closed-loop control unit which compares the actual speed with the maximum speed and adjusts the servomotor in a manner which depends on the difference between these speeds whenever the vehicle speed rises into the vicinity of the maximum speed.

A closed-loop vehicle speed-control unit described in German Patent Document DE-OS 41 15 903 A1 also automatically prevents a specified maximum speed from being exceeded. For this purpose, the control measure intervenes whenever the vehicle speed exceeds the maximum speed and includes, for example, a periodic interruption of the fuel supply, a brake actuation and/or a reduction of the throttle valve opening. In consequence, as in the case of the systems already mentioned for limiting the maximum speed, system intervention is again provided only when the vehicle speed has attained or exceeds the specified maximum speed.

German Patent Document DE-OS 36 18 844 A1 discloses a method for limiting the rotational speed of an internal combustion engine, which method can be switched to limit the travelling speed to a specified maximum speed when the highest gear has been selected. In this method, a two stage system intervention which controls rotational speed takes place when the respective maximum permissible engine speed is approached. A required value for the change with time of the engine rotational speed is provided by a required value signal generator as a function of the actual rotational speed, in accordance with a required value characteristic which decreases linearly from the maximum value above a first rotational speed threshold and becomes zero at the maximum rate of change rotational speed. A select-minimum switching system ensures that the maximum rotational speed is permitted at small engine rotational speeds below this first rotational speed threshold. When a second rotational speed threshold is exceeded in the closed-loop controlled rotational speed range, the system switches over from a first closed-loop control unit parameter, set for rapidly eliminating control deviations while accepting overshoots, to a second closed-loop control unit parameter set for slowly eliminating control deviations while avoiding any overshoot. Hysteresis is provided for switching over between the two types of closed-loop control in that switching to the control unit parameters set for rapid elimination of deviations takes place only when the speed becomes less than a third rotational speed threshold, which is lower than the second rotational speed threshold.

The object of the present invention is to provide a method and apparatus for limiting the speed of a motor vehicle to a specified limit, while ensuring a relatively accurate maintenance of the limit, with a high degree of driving comfort.

This problem is solved by the method and apparatus according to the invention, in which an open-loop control system intervenes to influence the speed within an interval of permitted speeds, i.e., below a maximum permissible speed or above a minimum permissible speed. When the speed demanded by the driver falls outside these upper and lower limits, the open-loop control system intervenes in accordance with a specified control characteristic as a function of the actual speed. By suitably specifying this control characteristic, it is possible to bring the actual speed to the specified limiting speed gently, and without abrupt changes in speed. When the actual speed is close enough to the specified limiting speed, a closed-loop control system is implemented in place of the open-loop control system. The closed-loop control system intervention ensures that the actual speed remains within the range fixed by the limiting speed even if the speed demanded by the driver is located within the range of the speeds which are to be avoided.

A further essential property of the method according to the invention is that neither the open-loop control system nor the closed-loop control system intervenes when the speed demanded by the driver is within the range of permitted speeds. This ensures that the vehicle can be driven at any desired speed within the range of permitted speeds. Thus, a driver's speed demand which deviates from the limiting speed in the direction of the range of permitted speeds does not lead to complete de-activation of the speed-limiting method. In contrast to closed-loop cruise control system regulation, for example, the speed-limiting method remains in readiness, for example, when a maximum permissible speed has been specified, even if the driver uses the brakes to slow the vehicle down from an actual speed which was above or at the maximum speed to a speed which is markedly lower. When an attempt is subsequently made to accelerate beyond the maximum speed, the speed-limiting method then prevents the maximum speed from being exceeded—initially by the open-loop control system and then, if necessary, by the closed-loop control system. Suitable system interventions can, of course, be provided in the remaining speed ranges, for example open-loop control system intervention to return the actual speed to the range fixed by the limiting speed when the actual speed is initially far beyond the limiting speed, and within the range of speeds to be avoided.

In one embodiment of a device for limiting vehicle speed to a maximum value in accordance with the present invention, the system intervention includes an effect on the maximum throttle butterfly opening angle such that, in the case of the open-loop control system intervention, a characteristic is specified for the maximum permitted opening angle for a particular actual speed whereas, in the case of closed-loop control system interventions, a closed-loop speed-control unit is provided which generates a signal for the maximum throttle butterfly opening angle as a function of the difference between the actual speed and the limiting speed. A change-over switch selects either this closed-loop control unit output signal or the control signal based on the characteristic, and the signal selected is supplied to a select-minimum unit in which the selected signal is compared with the throttle butterfly position signal associated with the speed demanded by the driver. In consequence, this selection of the minimum ensures that the accelerator pedal requirement is effected when it represents a speed which is located below the maximum speed specified by the speed-limiting device.

If the speed-limiting method is activated while the actual speed is within the permitted range, then, in accordance with a further embodiment of the invention, the open-loop control intervenes first, and the system is switched over to a closed-loop control at the latest when the actual speed has attained the specified limiting speed. For closed-loop speed-control, the required speed is, at the latest, matched to the limiting speed during the subsequent closed-loop control operation and it can, in particular, have been set to this value initially.

A further embodiment of the invention, has an advantage for damping overshoot effects, because the system is switched over from open-loop speed-control to closed-loop speed-control, if appropriate even before the limiting speed is attained. If the actual speed attains a defined value which comes before the limiting speed at the end of an open-loop control, the system initially waits for a predetermined interval (while keeping the instantaneous control parameters constant), to determine whether the vehicle will attain the limiting speed within this period due to the acceleration inertia. (In what follows, acceleration is also understood to mean a negative acceleration, i.e., a deceleration.) As soon as this is so, the system is switched over to closed-loop control, and the required speed is set to the limiting speed. If, on the other hand, the limiting speed is not attained before the predetermined interval has elapsed, the system is then switched over to closed-loop control, but the required speed is now initially set to the selected speed value which comes before the limiting speed, and is modified along a continuous ramp in the direction of the limiting speed during the initial closed-loop control phase. As soon as the actual speed has attained the value of the limiting speed in this manner, the required speed is set to be constant at this limiting speed. This measure substantially eliminates control oscillations, in particular excessive overshoot of the actual speed into the range of the speeds to be avoided.

In yet another embodiment of the invention, open-loop control system or closed-loop control system intervention includes controlling an engine torque, a gear-change and/or braking, dependent respectively on the actual speed. A coordinated combination of these different types of control is advantageous.

A further embodiment of the invention is suitable for maintaining a specified maximum speed, below which the method permits the driver to act freely with respect to the selection of speed, without the method being completely deactivated. As soon as a speed demanded by the driver is determined to exceed the maximum speed, while the speed is still below the maximum speed in the range of open-loop control interventions, the method controls the vehicle speed setting by open-loop means using maximum engine torque limitation which depends on the actual speed and employing an appropriate characteristic which has been stored for the maximum throttle butterfly opening angle.

In an extended configuration, the speed interval for open-loop control system interventions extends down to the rest condition of the vehicle. This is particularly useful for maintaining small permissible maximum speeds, for example in 30 km/h zones. In this case, the vehicle speed is subjected to open-loop control from vehicle pull-away if a rapid acceleration is attempted. This includes, in particular, controlling the gear changing of an automatic gearbox so that pull-away takes place in second gear when the accelerator pedal deflection (i.e., the vehicle speed demanded by the driver) , is not above a specified value. Specifying this threshold permits the driver to pull away more rapidly in an exceptional case by pressing down the accelerator pedal more strongly.

In still another embodiment of the invention which includes such a maximum speed limitation, it is advantageous to select a different setting for the maximum throttle butterfly opening angle specified for open-loop speed-control depending on whether the actual speed when the method is activated is below or above a specified threshold value which is located in the speed interval for open-loop control system interventions. If the actual speed is above this threshold value, and therefore closer to the specified maximum speed, the maximum opening angle permitted for a specified actual speed value in the characteristic is higher than that permitted in the case of an actual speed which is initially located below the threshold value. This measure avoids the actual speed approaching the limiting speed, and therefore entering the range of closed-loop speed-control intervention, too slowly. The system could otherwise tend towards such unduly slow approach because of the speed-limiting measures quoted above.

In yet another embodiment of the invention, the method can be switched on and off by the user, with suitable transition measures provided when the user switches on and off. These measures bring the vehicle speed from the previous value to the speed required for the subsequent driving operation, without excessive and sudden acceleration, even when the new required speed initially differs markedly from the limiting speed.

In another embodiment of the invention, the speed-limiting device is also equipped with a closed-loop cruise control system which can be optionally activated instead of the speed-limiting function. By means of this embodiment, a speed once attained, can therefore be optionally held constant with the closed-loop cruise control system function, or the speed-limiting function can prevent the vehicle's travelling faster than or slower than a specified limiting speed.

Other objects, advantages and novel features of the present invention will become apparent from the following detailed description of the invention when considered in conjunction with the accompanying drawings.

DETAILED DESCRIPTION OF THE DRAWINGS

The method and apparatus described below include the capability of limiting the speed of a motor vehicle automatically to a specified maximum permissible speed of $V_G$=30 km/h. As an alternative, the device can provide a different limiting speed and the system can have means for setting different limiting speeds in steps or without steps. The speed limitation includes engine torque intervention, influencing the gearbox and, possibly, brake intervention. In addition, the device includes a conventional closed-loop cruise control system. The speed-limiting device described is, for example, suitable for vehicles with a follow-up automatic gearbox and engine control electronics with electronic accelerator pedal function.

The speed-limiting function can be switched on and off by the vehicle driver by means of a switch device (not shown). The same applies to the closed-loop cruise control system function which is additionally provided. The working ranges of the two functions are set in such a way that they do not overlap. That is, the 30 km/h limitation is activated only, after appropriate switch actuation, when the actual vehicle speed is below the minimum speed required for closed-loop cruise control (for example, 36 km/h). The activation of the speed-limiting device is not restricted in the downwards direction, and is possible from the vehicle at-rest condition. Because of the separated working ranges, the closed-loop cruise control system switch can also be used as the switch for the speed-limiting device.

Apart from the associated switch operated by the driver, the speed-limiting function is also switched off automatically when the "P", "N" or "R" steps of the automatic gearbox are selected. In addition, the 30 km/h limitation is switched off when a kick-down switch is actuated in order to permit the driver to rapidly drive out of a dangerous situation when the speed-limiting function has been previously activated. Alternatively, the speed-limiting function can also be switched off when a threshold value of the accelerator pedal deflection and/or of the gradient of the accelerator pedal actuation speed is exceeded.

Because the driver has less engine torque available than usual when the speed-limiting function is switched on, provision is made to inform him of this condition by means of an optical display located within his field of view (for example, a light shaft, an additional function lamp in a combined speedometer instrument, or double utilization of an existing display, such as an external temperature display in which when the limitation is switched off, the external temperature is displayed and when the limitation is switched on, the above limitation information is displayed, for example by means of "30 km/h" lettering). In addition, a fault or danger warning is provided when a fault due to the system occurs or when the maximum permissible speed is exceeded on a downhill section despite the fact that the speed-limiting function is switched on. In addition to an optical display, for example a flashing display, this warning can take place by means of tactile information such as a shaking effect on the accelerator pedal, or by an acoustic warning in the form of a buzzer or gong.

The 30 km/h speed-limiting function is divided into two types of operation, specifically, an operation with open-loop speed-control and one with closed-loop speed-control. The open-loop control is active within a speed range from zero to below the maximum speed and for the provision of a transition function after the speed limitation has been switched off. The closed-loop control is active when the actual speed is located near the maximum speed or above it in the range between the maximum speed and minimum speed required by the closed-loop cruise control system. If the limitation is switched on at an actual speed above the closed-loop cruise control system minimum speed, a reduction in speed can first take place by intervention of an open-loop control, for example, brake intervention, gear-changing in the downward direction and/or closed-loop cruise control system switch operation in the delay direction.

The speed-limiting function is first explained below for the case where it is switched on when the actual vehicle speed is substantially below the specified limiting speed of 30 km/h, for example when the vehicle is at rest. So that the actual speed does not exceed the limiting speed in the case of rapid acceleration from rest, or in the case of small initial speeds, the pull-away torque is reduced by the active speed-limiting function. On the other hand, the torque limitation must still permit lively pull-away on slopes. This is achieved in the speed-limiting method by the following procedure.

On the one hand, the gearbox is controlled so that the second gear is selected for pull-away if the first gear is not required for engine reasons, and if the driver's specification by means of the accelerator pedal does not exceed a set threshold value of the pedal deflection. If the deflection threshold is exceeded, the vehicle pulls away in first gear. In addition, upshifting of the gears is controlled, for example, so that the change from first to second gear occurs at a specified gear-changing speed before the closed-loop control phase is attained and, from the moment when a further speed threshold is exceeded, a shift into third gear is prevented in order to avoid possible overshoot of the actual speed above the limiting speed because of the gear changing procedure.

Figure 2:
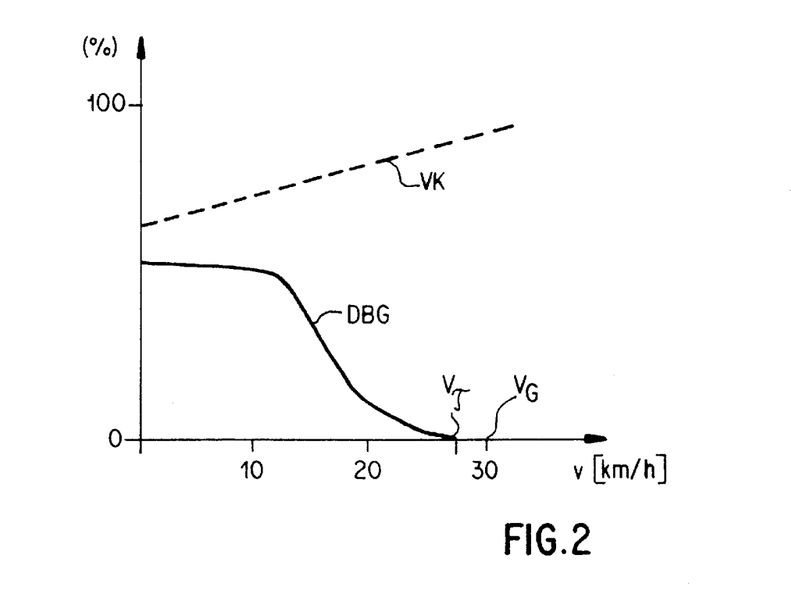
FIG. 2 shows a characteristic of the maximum throttle butterfly opening angle as a function of the actual speed, such as is used for open-loop speed-control of the device of FIG. 1.
Figure 3A:
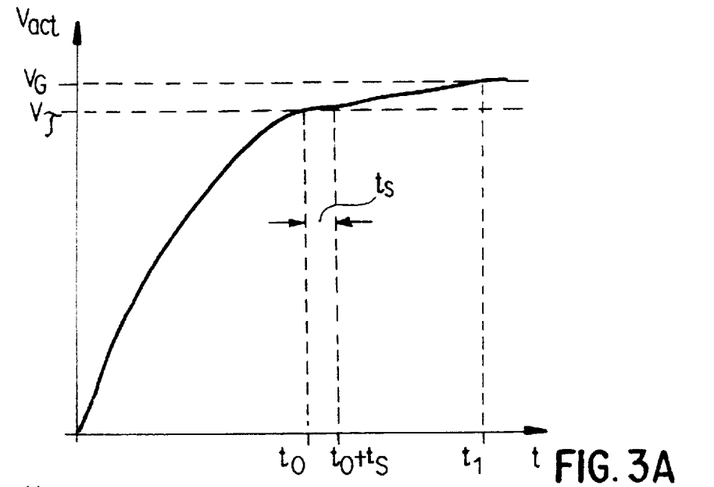
FIGS. 3A–3D show the time variation for various parameters during a pull-away phase influenced by the speed-limiting apparatus.

Furthermore, in addition to the influence exerted on the gearbox, engine torque is controlled by controlling the maximum throttle butterfly angle in accordance with the following four measures. As a first measure, the maximum throttle butterfly opening angle is limited in accordance with a specified characteristic (DBG) as a function of the actual vehicle speed. A typical shape of this limiting characteristic curve (DBG) is shown in FIG. 2, together with the full-load characteristic (VK), the opening angle (ÖW) being plotted on the ordinate. As a second measure, the output of the required value for engine torque limitation is delayed during closed-loop control upwards, by means of a suitably matched $PT_1$ element, it being possible to select different parameters of this element for the individual gears. In order to avoid overshoot of the actual speed ($v_{act}$) beyond the limiting speed of 30 km/h, a speed value ($v_r$) slightly below the limiting speed ($v_G$=30 km/h) is specified as the third measure, as can be seen from FIG. 3A. Below this selected speed value (vr) the open-loop speed-control takes place in accordance with the specified characteristic (DBG) (FIG. 2). At the set speed $v_r$, the specified characteristic (DBG) attains the value of zero, which prevents speed overshoot during the controlled approach of the actual speed toward the limiting speed. As soon as the actual speed ($v_{act}$) has attained the set value ($v_r$) below the limiting speed ($v_G$), the system waits for a specified period ($t_s$) to see whether the actual speed ($v_{act}$) attains the limiting speed ($v_G$) during that period.

As soon as this occurs, the system switches over from speed limitation by open-loop control to speed limitation by closed-loop control, the limiting speed value ($v_G$) being fixed as the associated required value ($v_s$). A PI closed-loop control unit is used as the speed-control unit for the closed-loop control speed limitation. After the predetermined interval ($t_s$) has elapsed (FIGS. 3A, 3B), at the latest, the system then switches over to closed-loop control speed limitation, even if the actual speed ($v_{act}$) has not yet attained the limiting speed ($v_G$) up to that point, the required value ($v_s$) being initially set, in this case, the speed ($v_r$) which has been fixed below the limiting speed ($v_G$). This speed ($v_r$) marks the upper end of the speed interval for open-loop control speed limitation. From this point, the required speed ($v_s$) increases linearly toward the limiting speed ($v_G$). While the required value is being increased linearly, only the P proportion of the PI closed-loop control unit is effective because the I proportion is set to zero. As soon as the actual speed ($v_{act}$) has attained the limiting speed ($v_G$) by means of these measures, the required speed ($v_s$) is set to the limiting speed value ($v_G$) and the full PI proportion of the closed-loop control unit is activated. As an alternative, the system can of course switch over to closed-loop speed-control as soon as a selected speed value, which is just below the limiting speed ($v_G$), is attained by the actual vehicle speed.

In order to avoid undesirable switch-over procedures between open-loop control and closed-loop control because of normal closed-loop speed-control oscillations around the limiting speed ($v_G$), it is likewise useful, in the case of active limitation, to switch over from closed-loop control operation to open-loop control operation only when the actual speed ($v_{act}$) has fallen below the limiting speed ($v_G$) by a specified value. If it is found that the desired increase in speed is not attained by the above measures, a fourth measure consists in increasing the required value for the maximum throttle butterfly opening angle, as specified by the control characteristic (DBG), by a specified factor.

Figure 1:
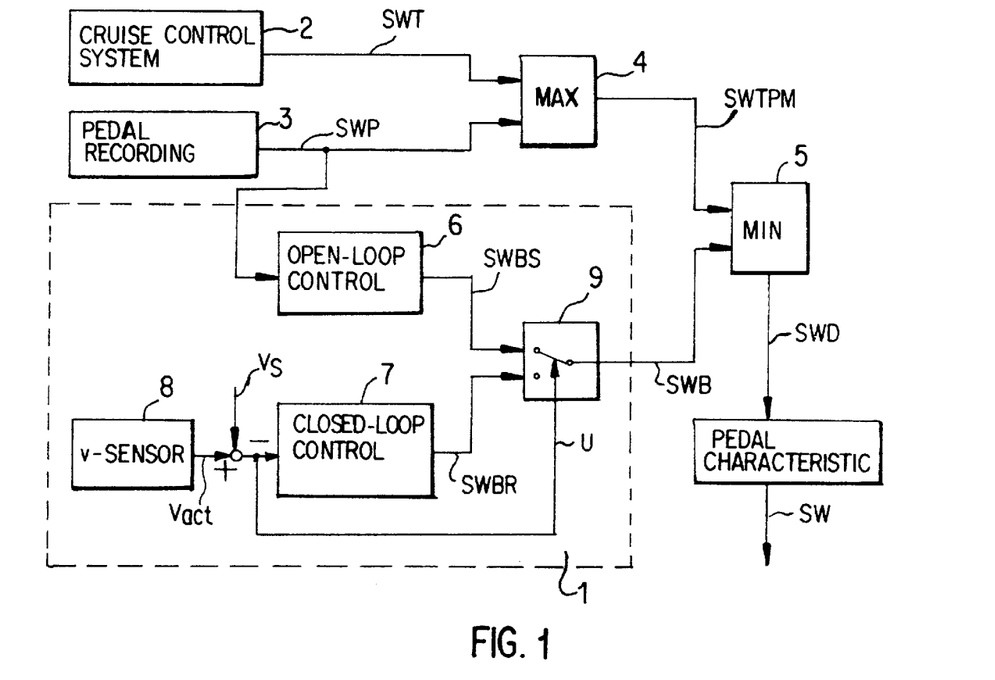
FIG. 1 shows a block diagram of an apparatus for limiting engine torque within a device for limiting the vehicle speed to a maximum speed of 30 km/h.

In order to accomplish the above specifications for controlling the maximum throttle butterfly opening angle, the speed-limiting device has an engine torque control unit, which is shown in FIG. 1. A unit (3) for recording the accelerator pedal position generates a throttle butterfly position signal (SWP), which indicates the driver's requirement for engine torque. This signal is supplied in parallel with the output signal (SWT) of the closed-loop cruise control system (2) mentioned above, to the input of a select-maximum stage (4). The larger of these engine torque requirement signals is then sent as an output signal (SWTPM) to an input of a subsequent select-minimum stage (5).

The signal (SWP) of the accelerator pedal position recording unit (3) is also supplied to a speed-limiting function sub-assembly (1) which carries out the actual 30 km/h speed-limiting function. For this purpose, it contains an open-loop speed-limiting control unit (6), a closed-loop speed-control unit (7), an actual speed sensor (8) and a change-over switch (9). The signal (SWP) from the accelerator pedal position recording unit (3) is supplied to the input of the open-loop speed-limiting control unit (6) which uses it to determine the engine torque demanded by the driver. As a function of the latter and of the actual speed present, the speed-limiting control unit (6) outputs an output control signal (SWBS) for the throttle butterfly position, this signal being supplied to a first input of the change-over switch (9). A subtraction stage at the input of the closed-loop control unit (7) subtracts the required speed value ($v_s$) from the actual vehicle speed ($v_{act}$) recorded by means of the speed sensor (8) and supplies the resulting control deviation to the closed-loop control unit (7). In addition, this control deviation signal is used as the control signal (U) for the change-over switch (9). The closed-loop control unit (7) generates an output signal (SWBR) for the throttle butterfly position, which is supplied to a second input of the change-over switch (9). Further components, for example, for generating the ramp-shaped signal for the required speed ($v_s$) and for controlling the gearbox, are omitted from FIG. 3 reasons of clarity.

By means of the change-over switch (9), either the output signal (SWBS) of the open-loop control unit (6) or the output signal (SWBR) of the closed-loop control unit (7) is passed through as the output signal (SWB) of the speed-limiting function sub-assembly (1), and is supplied to a further input of the select-minimum stage (5). The latter permits the signal with the smaller engine torque requirement (i.e., the smaller maximum throttle butterfly opening angle) to pass through to a pedal characteristic unit (10) which generates, by means of an accelerator pedal characteristic, the setting signal (SW) which is effective for the throttle butterfly setting, as is usual in the case of the required value for the closed-loop cruise control system.

The speed-limiting device contains, furthermore, a pressure point actuator (not shown) which generates, by means of a spring with a free-running clutch, an accelerator pressure point which can be passed through. The driver can position his foot on the pressure point and is made aware that the 30 km/h limitation is active by the heavy movement of the accelerator pedal. When the limitation of the accelerator pedal is active, it prevents the driver's pushing the accelerator pedal down hard because of the lack of association otherwise existing between the engine torque and the accelerator pedal position.

This construction of the speed-limiting function group provides the desired properties. If, as described above for example, the speed-limiting function is activated and the actual speed ($v_{act}$) is far below the limiting speed ($v_G$) (i.e., in the range of open-loop speed-control), the closed-loop cruise control system (2) is initially inactive and the select-maximum stage (4) permits the driver's requirement (SWP) to pass through to the select-minimum stage (5). Simultaneously, because the actual speed ($v_{act}$) is substantially below the limiting speed ($v_G$), the change-over switch (9) permits the signal (SWBS) from the speed-limiting open-loop control unit (6) to pass through as the output signal, whereas the speed closed-loop control unit (7) remains inactive. The select-minimum stage (5) now ensures that when engine power is demanded by the driver which is greater than the specified characteristic (DBG) for the maximum throttle butterfly opening angle, the output signal (SWBS) of the speed-limiting open-loop control unit (6) determined by this characteristic (DBG) is permitted to pass through as the effective throttle butterfly setting signal which effects open-loop speed-control. If, on the other hand, the engine torque demanded by the driver is less than the maximum permitted by this characteristic (DBG), this driver's requirement is permitted, by the select-minimum stage (5), to pass through to the throttle butterfly setting system. This ensures that the driver can drive at any speed below the limiting speed of 30 km/h without being influenced by the speed-limiting device, while the speed-limiting function remains in readiness in the background, and is actively employed when the driver's engine torque demand is higher than that permitted by the characteristic (DBG).

As soon as the above-mentioned switch-over point from open-loop to closed-loop speed-control is recognized by the speed-limiting device (from the fact that the control deviation at the input to the closed-loop control unit (7) is zero), the change-over switch (9) is driven to its other position whereupon the output signal (SWBR) of the closed-loop control unit (7) is used thereafter as the output signal (SWB) of the speed-limiting function subassembly (1). The select-minimum stage (5) again ensures that in the case of driver's demands above the limiting speed ($v_G$), the closed-loop control speed-limiting system intervention is effective in setting the throttle butterfly, whereas the driver's demand is permitted to pass through as soon as it corresponds to speeds below the limiting speed ($v_G$). As a variant of the above behavior, when the speed-limiting function is switched on while an actual speed value ($v_{act}$) is just below the limiting speed ($v_G$) (i.e., between a specified threshold value just below the limiting speed ($v_G$) and the latter), provision is made for a current gear stage to be retained to control the gearbox (i.e., the system does not permit the gearbox to be shifted down into first gear); for the maximum throttle butterfly opening angle specified by the characteristic (DBG) for open-loop speed-control system interventions to be increased by a specified factor; and for the required value output not to be undertaken via the first-order delay element, as in the case described above. This measure is used to avoid an excessively slow attainment of the limiting speed, which could otherwise occur, given this starting condition of the speed-limiting method, because of the overshoot-damping measures.

Figure 3B:
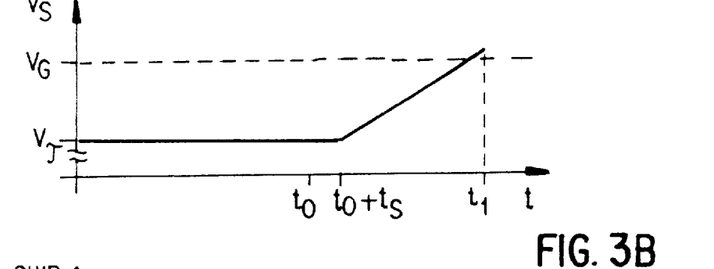
Figure 3C:
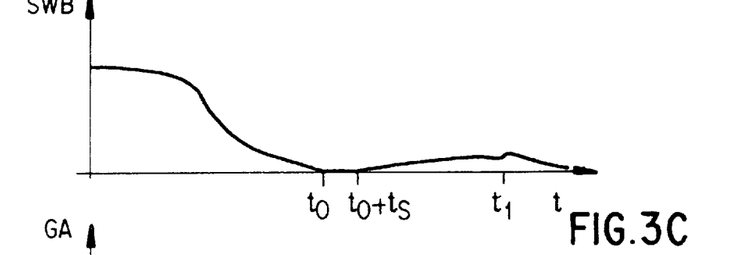
Figure 3D:
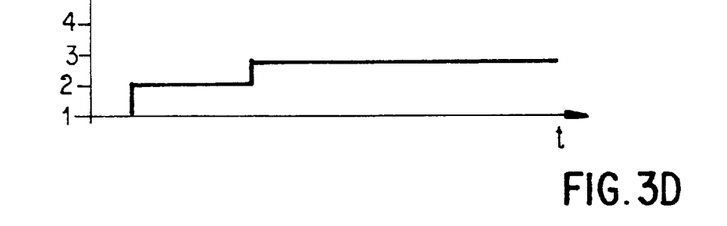

The curve diagrams of FIGS. 3A–3D illustrate a typical speed-limited pull-away procedure using the speed-limiting device of FIG. 1. The four diagrams show, in parallel, the variation with time of various parameters and, specifically, from top to bottom, those of the actual speed ($v_{act}$) (FIG. 3A), the required speed value ($v_s$) (FIG. 3B), the output signal (SWB) of the speed-limiting function sub-assembly (1) (FIG. 3C) (which in this case, is therefore the output of the select-minimum stage (5)); and of the gear setting (GA) (FIG.3D). In these Figures, it is assumed that a speed greater than 30 km/h is demanded by the driver by means of the accelerator pedal.

Up to a time ($t_0$), open-loop control speed-limitation is performed, for which the throttle butterfly opening angle is limited to the maximum value specified by the associated characteristic (DBG). (See FIG. 3C.) During this open-loop control speed-limiting operation, the gearbox is shifted up into second gear after a relatively short period and up into third gear at a specified actual speed value, as may be seen from the bottom diagram (FIG.3D). The closed-loop required speed value ($v_s$) remains, during this period of non-activated closed-loop control, at the speed value ($v_r$) below the limiting speed ($v_G$), at which the characteristic (DBG) for the throttle butterfly opening angle limitation has fallen to the value zero.

At the time ($t_0$), the actual speed ($v_{act}$) has attained the final value ($v_r$) and the speed-limiting method waits, during the specified period ($t_s$) (while maintaining the value zero for the throttle butterfly opening angle), to see whether the actual speed rises to the limiting speed. If so, the system switches over without delay to closed-loop operation, with PI closed-loop control and the limiting speed (($v_G$) as the required value ($v_s$). If (as in the example represented) this does not occur, the system switches over, after the specified time interval ($t_s$) has elapsed, to closed-loop control speed-limiting operation, with the I control proportion initially kept inactive. In this case, the required value ($v_s$) is initially placed to the final value ($v_r$) of the control characteristic (DBG), this value being located below the limiting speed ($v_G$) From there, it increases linearly along a ramp function in the subsequent closed-loop control operation, as can be seen from FIG. 3B. The active P closed-loop control proportion undertakes a corresponding increase in the specified maximum throttle butterfly opening angle, as may be seen from the second diagram from the bottom (FIG. 3C).

The actual speed ($v_{act}$) is brought up to the limiting speed of 30 km/h by the above measure. As soon as it has attained this speed at a later time ($t_1$), the increase in the required value ($v_s$) along the ramp is ended, and the required value is set to the limiting speed ($v_G$). The I proportion of the closed-loop speed-control unit (7) is activated at the same time, so that from this time, the speed is kept to 30 km/h by a PI closed-loop control unit.

This closed-loop speed-limiting operation ensures constant travel at 30 km/h as long as the driver does not specify a smaller speed requirement. Criteria comparable with those for the conventional closed-loop cruise control system are used for maintaining travel at this constant speed. Instead of the PD-$T_1$ control unit known from the closed-loop cruise control system, however, the PI closed-loop control unit (7) is used, with first order delay behavior and gear-dependent closed-loop control parameters, if required. The throttle butterfly setting range is used up to the full-load characteristic for closed-loop control. In order to match the system to the vehicle behavior, the engine torque calculated by the speed-limiting closed-loop control system is controlled by means of the progression characteristic converted by the accelerator pedal characteristic unit (10). This progression characteristic fixes the actual value of the throttle butterfly opening angle as a function of the specified maximum opening angle, as is also conventional practice in the case of closed-loop cruise control. The shape of the characteristic is appropriately selected.

If the actual speed should increase beyond the limiting speed, despite the influence of the gearbox and the intervention in the engine torque, the gearbox is shifted down and/or braking interventions are undertaken by the system as further measures which are undertaken in stages. In this manner, oscillating gear changes can then be avoided by observing the engine torque and comparing it with that which is necessary for the limiting speed on a flat road. In order to counter an excessive reduction in the actual speed at the beginning of an uphill slope in the case of an actual speed which substantially exceeds the limiting speed because of a downhill slope, the required value is placed somewhat above the limiting speed in such a case, and is then decreased linearly, to the limiting speed. As a further measure, an anti-coasting judder function ensures that no oscillation of the coasting switch-off occurs on downhill sections. The function provides that the coasting switch-off, which has previously been released at a fixed release speed above the limiting speed is cancelled only at a vehicle speed located below the release speed.

As soon as the driver's specification for the throttle butterfly setting again falls below the closed-loop control specification during a closed-loop control speed-limiting phase, the driver's specification has priority because the minimum value is selected, so that the closed-loop control phase is ended and the PI control unit is reset. In contrast to the closed-loop cruise control system function, the speed-limiting function is not, however, switched off by a brake actuation.

If, when the speed-limiting function is switched on, the actual speed ($v_{act}$) is, in fact, below the closed-loop cruise control system minimum threshold, but above the limiting speed ($v_G$) (i.e., between 30 km/h and 36 km/h, for example), a speed-reducing intervention takes place under open-loop control, as follows. The speed-limiting open-loop control unit (6) emits, as its output signal, the signal for zero maximum throttle butterfly opening angle. The change-over switch (9), passes this signal through to the select-minimum stage (5), and it is selected by the latter for setting the throttle butterfly. For further vehicle deceleration, the engine braking torque is brought into action by shifting the gearbox down to third gear. If it is further determined that the delay has exceeded a selected value, the gearbox is further shifted down into second gear (if, of course, this has not already occurred).

The additional closed-loop cruise control function of the device, which is achieved by means of the closed-loop cruise control system (2), is of a conventional nature and does not need to be described in any more detail here. In particular, the closed-loop cruise control system (2) has an operating lever which can be used to accelerate or decelerate the vehicle and, after it has been released, the actual speed then achieved is used as the required speed for the closed-loop cruise control. The requirement may now arise to switch on the speed-limiting function when the actual speed is located above the minimum closed-loop cruise control speed threshold and when, therefore, the speed-limiting function does not intervene directly (for example, when a 30 km/h speed limit zone begins in a locality in which the otherwise usual 50 km/h limit applies). In order to activate the 30 km/h limitation, in this case, the driver may, as an alternative to braking, actuate the closed-loop cruise control system operating lever to decelerate the vehicle in order to cause the gearbox to shift down. Subsequently releasing the operating lever either causes the closed-loop cruise control function to be activated, if the actual speed is still above the closed-loop cruise control minimum threshold, or causes the speed-limiting function to be activated, if the actual speed has fallen below this threshold.

Because the driver usually demands a higher engine torque than is permitted when the speed-limiting function is active, transition functions are provided which become effective after the speed-limiting function is switched off. These functions increase the vehicle speed from the limiting speed to the speed demanded by the driver without an acceleration jolt. Different measures are provided, depending on what causes the speed-limiting function to be switched off.

If the driver switches off the 30 km/h speed-limiting function by means of the operating switch provided for this purpose, for example on the closed-loop cruise control system, a continuous acceleration of the vehicle takes place without any reduction of comfort, until the driver's speed requirement specified by the accelerator pedal is attained. For this purpose, the speed-limiting device increases the engine torque linearly when it recognizes that the 30 km/h limit has been switched off. The slope of the ramp function is specified by a characteristic as a function of the accelerator pedal position, and increases with increasing accelerator pedal deflection, so that the vehicle acceleration during the transition function becomes greater as the accelerator pedal is depressed farther.

The speed demanded by the driver can therefore always be attained within approximately the same interval, independently of the difference between the speed demanded by the driver and the actual speed beforehand in the range fixed by the limiting speed. If the accelerator pedal position is altered during the ramp-shaped increase in speed, the system immediately ensures that the slope and the ramp is matched to the new accelerator pedal position. If, as a result, the full-load characteristic is exceeded by a specified amount, the maximum throttle butterfly opening angle is set to 100% so that the actual throttle butterfly position will then be determined only by the accelerator pedal position or the full-load characteristic. This then marks, in turn, the end of the transition phase, and the speed-limiting function is transferred into the inactive condition.

The transition function is also, of course, always ended immediately whenever the driver releases the accelerator pedal during this phase to such an extent that the engine torque demanded is smaller than the torque provided by the ramp function. If, during the transition phase, the driver actuates an available kick-down switch for a specified time interval, the signal prepared by the system for the throttle butterfly setting is increased with a steeper ramp curve to the driver's specification, so that the full vehicle acceleration is available to the driver and the speed-limiting function is ended.

If the system recognizes that the driver has switched off the speed-limiting function by means of the kick-down switch, this is assessed as being an attempt to accelerate as rapidly as possible. In the subsequent transition function of the speed-limiting device, the signal for the maximum throttle butterfly opening angle is correspondingly increased relatively rapidly in accordance with a stored characteristic after a specified tolerance time has elapsed. The characteristic can, in particular, contain an engine torque step at the beginning. In addition, the gearbox is controlled so that it is not permitted to change down into first gear. The end of the transition function takes place, in this case, in a manner analogous to the case, described above, of the switching off by the switch of the speed-limiting function.

Further matching and display measures can be undertaken to suit the particular vehicle. In the case of a vehicle with traction control, the torque limitation system acts in an increasing sense during an acceleration ramp of the speed-limiting function, for example, and therefore against the traction control. In consequence, the reduction requirement of the traction control is given higher priority. To prevent an engine torque step due to an increase, in the meantime, of the acceleration ramp value after any such traction control intervention, provision is made to maintain the required engine torque value on the ramp specified by the speed-limiting function during the traction control intervention and to continue from the retained value after the traction control intervention.

Of course, the speed-limiting system described above and the speed-limiting method achieved by this are not only suitable for maintaining a maximum speed of 30 km/h but also for maintaining any other maximum speed value. If required, a stepless setting of the limiting speed can be provided. In addition, it is also possible to employ the speed-limiting method to maintain a minimum speed, for which purpose the measures described above may be suitably matched to the reversed case with respect to the speed direction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for limiting speed of a motor vehicle to a specified limiting speed which forms a boundary between a range of speeds which are to be maintained and a range of speeds which are to be avoided, said method comprising the steps of:

detecting actual speed of said vehicle;

detecting a speed demanded by a driver of said vehicle by an input device;

when the speed demanded by the driver is within the range of speeds to be maintained, controlling said actual speed of said vehicle to accord with the speed demanded by the driver;

when the speed demanded by the driver is within the range of speeds to be avoided, determining whether the actual speed of the vehicle is within a first specified interval of the range of speeds to be maintained, and if so, performing open-loop control of vehicle speed in accordance with a predetermined open-loop control characteristic, based on said actual vehicle speed; and determining whether the actual vehicle speed is within a second specified interval of the range of speeds to be maintained, which second specified interval lies between said first specified interval and the specified limiting speed, and if so, performing closed-loop control of vehicle speed.

2. Method according to claim 1, wherein:

when said actual vehicle speed changes from a value which lies within said first specified interval to a value which lies within said second specified interval, the method switches from the open-loop control of vehicle speed to the closed-loop control of vehicle speed no later than when the actual vehicle speed attains the limiting speed; and a required speed for the closed-loop control is preset at a value equal to the limiting speed or increases linearly towards it.

3. Method according to claim 2, wherein when during said open-loop speed-control, the actual speed exceeds a predetermined specified speed value which is less than the limiting speed, the actual speed is observed for a specified time period; and when the actual speed attains the limiting speed within the specified time period, the method switches to the closed-loop speed-control with a required speed set at a value which is equal to the limiting speed; and if the actual speed does not attain the limiting speed within the specified time interval, after the specified time period has elapsed the method switches over to the closed-loop speed-control with a required speed which changes linearly from the specified speed.

4. Method according to claim 1, wherein the open-loop or the closed-loop speed-controls include at least one of engine torque control, gear-shifting control, and brake control as a function of the actual speed.

5. Method according to claim 4, wherein the limiting speed is the upper end of the range of speeds to be maintained, the open-loop speed-control includes a limitation of the maximum opening angle of a throttle butterfly based on the actual vehicle speed, and the closed-loop speed-control includes setting the opening angle of the throttle butterfly as a function of the actual speed.

6. Method according to claim 5, wherein the first specified interval of the range of speeds to be maintained includes the speed value zero as a lower limit, and the open-loop speed-control includes intervention in an automatic gearbox gear selection which provides for pulling away in second gear if the deflection of an accelerator pedal is not located beyond a specified value.

7. Method according to claim 5, wherein for the open-loop speed-control which is activated at a vehicle speed that is above a specified threshold value in the range of speeds to be maintained, a maximum throttle butterfly opening angle is generated as a function of the actual speed, which maximum throttle butterfly opening angle is a fixed amount greater than a butterfly opening angle that is used for the open-loop speed-control which is activated at a vehicle speed that is less than the specified threshold value.

8. Method according to claim 5, wherein said method can be activated and deactivated under manual operation, said method comprises the further steps of:

performing a speed-reducing, open-loop control when the method is first activated and the actual speed is outside the second specified interval of the range of speeds to be maintained; and performing a transition function when the method is deactivated and a driver demanded speed is outside the limiting speed, whereby a maximum throttle butterfly opening angle determined by a previous open-loop or closed-loop speed-control is continuously adjusted to the value demanded by the driver.

9. Apparatus for limiting the speed of a motor vehicle to a specified limiting speed which forms a boundary between a range of speeds which are to be maintained and a range of speeds which are to be avoided, utilizing a method which detects actual speed of said vehicle; detects a speed demanded by a driver of said vehicle via an accelerator pedal; when the speed demanded by the driver is within the range of speeds to be maintained, controls actual speed of said vehicle to accord with the speed demanded by the driver; when the speed demanded by the driver is within the range of speeds to be avoided, determines whether the actual speed of the vehicle is within a first specified interval of the range of speeds to be maintained, and if so, performs open-loop control of vehicle speed in accordance with a predetermined open-loop control characteristic, based on the actual vehicle speed; and determines whether the actual vehicle speed is within a second specified interval which includes the specified limiting speed, and if so, performs closed-loop control of vehicle speed, said apparatus comprising:

a unit for recording the position of an accelerator pedal of said vehicle;

a speed-limiting function subassembly having a speed sensor, a closed-loop speed-control unit connected to the speed sensor, an open-loop speed-limiting control unit and a change-over switch for selecting one of the output signal of the open-loop control unit and the output signal of the closed-loop control unit as the speed-limiting output signal, the output signal of the unit for recording the accelerator pedal position being supplied as an input to the open-loop control unit; and a select-minimum stage to which can be supplied the output signal of the unit for recording the accelerator pedal position and the output signal of the speed-limiting function subassembly and whose output signal determines the maximum throttle butterfly opening angle.

10. Apparatus according to claim 9, further comprising:

an existing cruise control system; and a select-maximum stage; wherein an output signal of the existing cruise control system and the output signal of the unit for recording the accelerator pedal position are supplied as inputs to the select maximum stage; and output signal of the select maximum stage and an output signal of the speed-limiting function subassembly are supplied as inputs to the select minimum stage.

* * * * *